United States Patent [19]

Lewis

[11] 3,899,425

[45] Aug. 12, 1975

[54] MODULAR FILTER AND AUTOMATIC CHLORINATOR FOR SWIMMING POOLS

[75] Inventor: Kenneth Lewis, South Gate, Calif.

[73] Assignee: H.S.M. Americas Ltd., Signal Hill, Calif.

[22] Filed: Apr. 5, 1974

[21] Appl. No.: 458,091

Related U.S. Application Data

[63] Continuation-in-part of Ser. No. 284,237, Aug. 28, 1972, abandoned.

[52] U.S. Cl. .................. 210/206; 210/62; 210/169; 210/232; 210/438
[51] Int. Cl. .............................................. E04h 3/16
[58] Field of Search.......... 210/62, 169, 198 R, 201, 210/203, 206, 430, 437, 438, 439, 440, 443, 463, 232

[56] References Cited
UNITED STATES PATENTS

| | | | |
|---|---|---|---|
| 900,510 | 10/1908 | French | 210/439 X |
| 2,197,252 | 4/1940 | Decker | 210/438 X |
| 2,362,530 | 11/1944 | Bennett | 210/438 |
| 2,714,964 | 8/1955 | Radford | 210/439 |
| 2,736,435 | 2/1956 | Gardes et al | 210/438 X |
| 3,367,507 | 2/1968 | Hultgren | 210/439 X |
| 3,481,478 | 12/1969 | Williams | 210/440 X |
| 3,734,291 | 5/1973 | Schondelmyer | 210/206 X |
| 3,846,078 | 11/1974 | Brett | 210/169 X |

Primary Examiner—Samih N. Zaharna
Assistant Examiner—Robert G. Mukai
Attorney, Agent, or Firm—Christie, Parker & Hale

[57] ABSTRACT

A modular pool filter having a plurality of stand pipes, each of which contain one or more annular filter elements which are in sealed relationship to the top and the bottom of the stand pipes, thus forming an inner region extending through the center of the filter elements and an outer annular region extending around the outside of the filter elements. Water is distributed to each of the stand pipes through the outer regions and is withdrawn from each of the stand pipes from the inner regions. An outlet pipe extends up through the inner region of each of the stand pipes so that water is withdrawn from the inner region adjacent the top end of the stand pipes. The upper end of the stand pipes is removable to permit removal or replacement of the filter elements in each of the stand pipes. The top on one or more of the filter stand pipes includes a separate air-tight chamber above the filter element in which chlorine tablets are stored. The center return line for the filter extends up through the filter element into the chlorinating chamber.

3 Claims, 3 Drawing Figures

MODULAR FILTER AND AUTOMATIC CHLORINATOR FOR SWIMMING POOLS

RELATED CASE

This application is a continuation-in-part of application Ser. No. 284,237, filed Aug. 28, 1972, now abandoned.

FIELD OF THE INVENTION

This invention relates to filter systems, and more particularly, to a modular filter system for swimming pools in which an automatic chlorinator is added to one or more of the filter modules.

Various types of filtering systems have heretofore been proposed for filtering the water in home swimming pools. Typically such filters include a tank in which the active filtering material is located. The water is forced through the filtering material by the pool pump. The filtering material typically might be sand and gravel, diatomaceous earth, or the like. Some filter designs have been proposed which use throwaway paper filters. However, the size of the filter must be selected according to the size of the pool and the quantity of water which must be effectively filtered. To provide filters of varying filtering area has heretofore required providing different size tanks. These tanks must be formed out of a noncorrosive metal, such as stainless steel, and are usually provided with a sealed but removable lid by which the filtering material or elements can be removed for cleaning or replacement. To provide a removable top, water connections are made at the bottom of the tank, which presents a problem in that air may become trapped in the top part of the tank keeping the level of the water from rising in the tank and thereby decreasing the filtering efficiency of the filter.

The use of automatic chlorinators for pools is well known in which pellets or tablets of chlorine are dissolved at a controlled rate into the pool water to maintain the desired chlorine concentration. Such know automatic chlorinator devices have generally provided for a portion of the water circulated through the filter system to pass through the chlorinator at a rate which maintains the desired chlorine concentration. Since to pass all the water through the chlorinator would dissolve the chlorine tablets at too fast a rate, building up the chlorine concentration in the pool to too high levels, various piping arrangements have been provided for diverting a control portion of the recirculating water through the chlorinator. Another problem is that in using such chlorinators, it is required that the water not remain in contact with the chlorine tablets during times when the water is not being circulated by the pumping system. This has necessitated some type of a scheme for draining the chlorinator whenever the pump is not operating.

SUMMARY OF THE INVENTION

The present invention is directed to an improved filter which is modular in design, each filtering module being identical to the other modules so that any number of modules may be incorporated in the filtering system depending upon the filtering area required for the system. The individual units of the filter can be made from standard polyvinyl chloride pipe material, thus eliminating the need for costly tanks made of stainless steel or other expensive anti-corrosive metals. Each module contains one or more replaceable filter elements which can be easily removed for cleaning or replacement. Circulation of water through the modules is arranged so that the water is divided among the several modules to provide parallel circulation paths. Water is removed near the top of the individual modules so that any air which enters the filters is withdrawn, yet the tops of the modules are easily removable to permit easy access to the removable filter elements.

The present invention includes an automatic chlorinator as part of the modular filter system. The automatic chlorinator can be attached directly to the upper end of one or more of the filter modules and is in the form of an extension of the stand pipe of the filter module. The extension provides an airtight chamber in which chlorine pellets are stored. Filtered water, after passing up the center of the filter module, passes into the chlorinating chamber where it comes in contact with the chlorine tablets. The chlorinated water then passes downwardly again through the center of the filter module through an outlet pipe which extends up into the chlorinating chamber. The automatic chlorinator unit can be added to the filter system without any piping connections, and the position of the chlorinator on top of the filter is such that the level of water when the pump is operating rises in the chlorinating chamber and falls below the level of the chlorine tablets when the pump is not circulating water through the filter.

BRIEF DESCRIPTION OF THE DRAWINGS

For a more complete understanding of the invention reference should be made to the accompanying drawings wherein.

DETAILED DESCRIPTION

Figure 1:
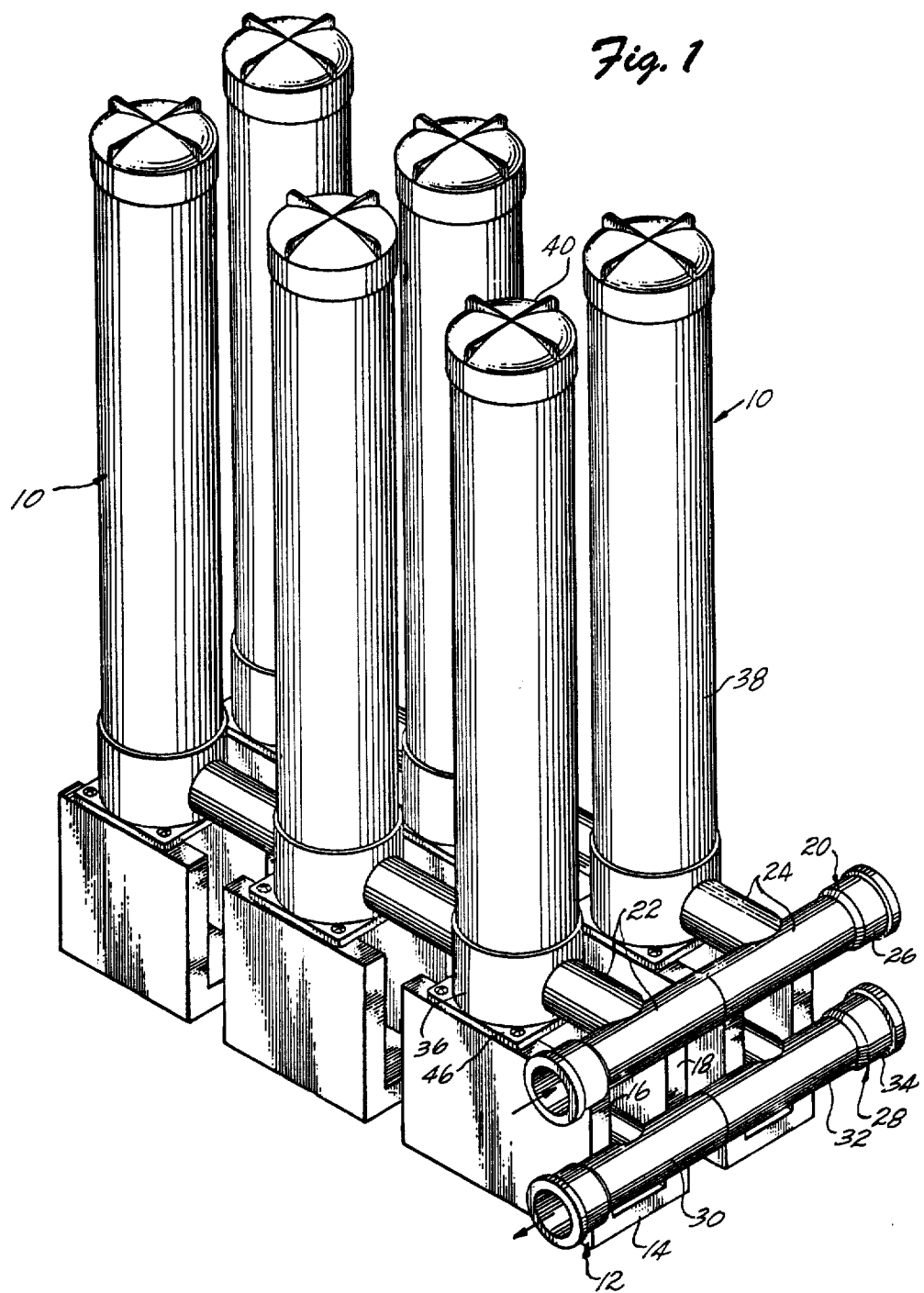
FIG. 1 is a perspective view of the modular filter system.

Referring to FIG. 1, the filter comprises a plurality of filtering modules, indicated generally at 10, six such modules being shown by way of example. The modules can be arranged in a plurality of parallel rows, FIG. 1 showing the six modules being arranged in two parallel rows of three modules. Each module is mounted on a support member 12 which is in the form of a channel having a base 14 and a pair of upwardly projecting vertical side walls 16 and 18.

The intake to the filter system is provided by an intake manifold, indicated generally at 20, having a T-connection as indicated at 22 and 24 for each row of filter modules. One end of the manifold is provided with a cap 26.

Similarly, output from the modular filter is provided by an outlet manifold, indicated generally at 28, which likewise consists of a plurality of T-connections, such as indicated at 30 and 32, and a cap 34. The manifolds 20 and 28 are preferably assembled from standard pipe and pipe fittings made of polyvinyl chloride (PVC) so that any number of rows of filter modules can be added on and the manifolds increased accordingly to accommodate whatever number of rows are provided in a given installation.

Each filter module includes a base member 36, preferably molded from a single piece of polyvinyl chloride (PVC). In addition to the base member 36, each filter module includes a cylindrical stand pipe 38 made, for example, from standard 3 inch PVC pipe. The upper end of each filter module is provided with a removable cap 40.

Figure 2:
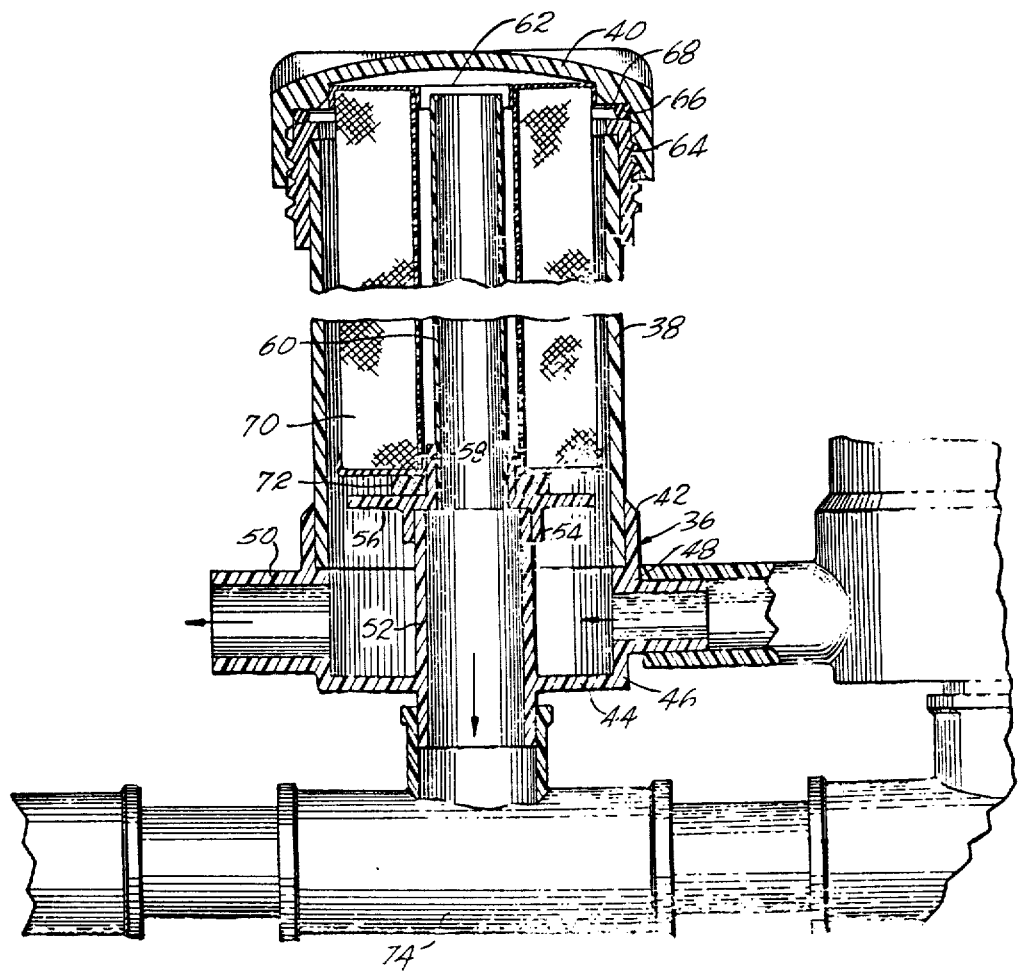
FIG. 2 is a sectional view taken through one of the filter elements showing the internal construction thereof.

As best seen in FIG. 2, the molded base 36 includes an integral collar 42 in which the lower end of the stand pipe 38 is inserted and cemented in place. The base 36 is molded with an integral bottom wall 44, the outer margins of the bottom wall being in the form of flanges 46 by which the bottom member 36 may be bolted or otherwise secured to the top surfaces of the side portions 16 and 18 of the channel 12.

One side of the base member 36 is provided with an integrally molded male connection 48 providing an inlet passage to the modular filter element. Diametrically opposite the inlet connector 48 is an axially aligned female outlet connection 50 providing an outlet passage from the modular filter element. A second outlet passage from the modular filter element is provided by an integrally molded pipe section 52, a portion of which projects below the bottom wall 44 to provide an external male connection and a portion of which projects above the bottom wall 44 into the interior of the filter unit along the central axis thereof.

The upper end of the outlet pipe 52 slidably fits into a collar 54 which forms part of a filter support member 56. The support member 56 is provided with a second integral collar 58 into which is inserted and cemented or otherwise secured a vertical tube 60. The tube 60 extends to its upper end 62 which is positioned slightly below the removable top member 40.

The top member 40 threadably engages a collar 64 which is fitted over and cemented to the upper end of the stand pipe 38. An O-ring 66 is positioned between the top of the collar 64 and a shoulder 68 molded on the interior of the top member 40, the O-ring providing a fluid-tight seal when the top member 40 is threaded onto the collar 64.

Filtering is provided by one or more axially aligned annular filter elements or cartridges 70 which extend between the support member 56 at the bottom and the member 40 at the top. The annular filter elements 70 may be conventional filter cartridges made of a nonwoven nylon, paper, or other suitable filter material. The lower end of the filter cartridge rests on a sponge rubber washer 72 while the upper end engages the inner surface of the cap or top member 40. When the top member 40 is screwed into position, it squeezes the filter cartridge downward compressing the sponge washer 72 so as to seal the top and bottom surfaces of the filter cartridge 70 thereby dividing the interior of the filter module into an inner region and an outer region, water being forced from the outer region to the inner region under pressure through the filter cartridge. The pipe 60 extends upwardly through the inner region for drawing off water (and any air that may accumulate) from the top end of the stand pipe.

For cleaning, the top member 40 can be unscrewed and the filter cartridge 70 removed by lifting up on the tube 60 and separating the support member 56 from the top of the outlet pipe 52.

It will be appreciated that the construction of the molded base member 36 permits any number of base members to be arranged in a row, the male connection 48 of one base member being inserted into the female connection 50 of the adjacent base member to form a row of filter modules. The return flow of filter water through the tube 60 and outlet pipe 52 insures that water is removed from the top of the stand pipe, thereby preventing the accumulation of air at the tops of the filter modules which otherwise might keep the water level from rising in the stand pipe to sufficient height to get effective filtering action. The standard PVC T-connections, such as indicated at 74, are used to connect the outlet pipe 52 to adjacent filter modules and to the outlet manifold 28.

Figure 3:
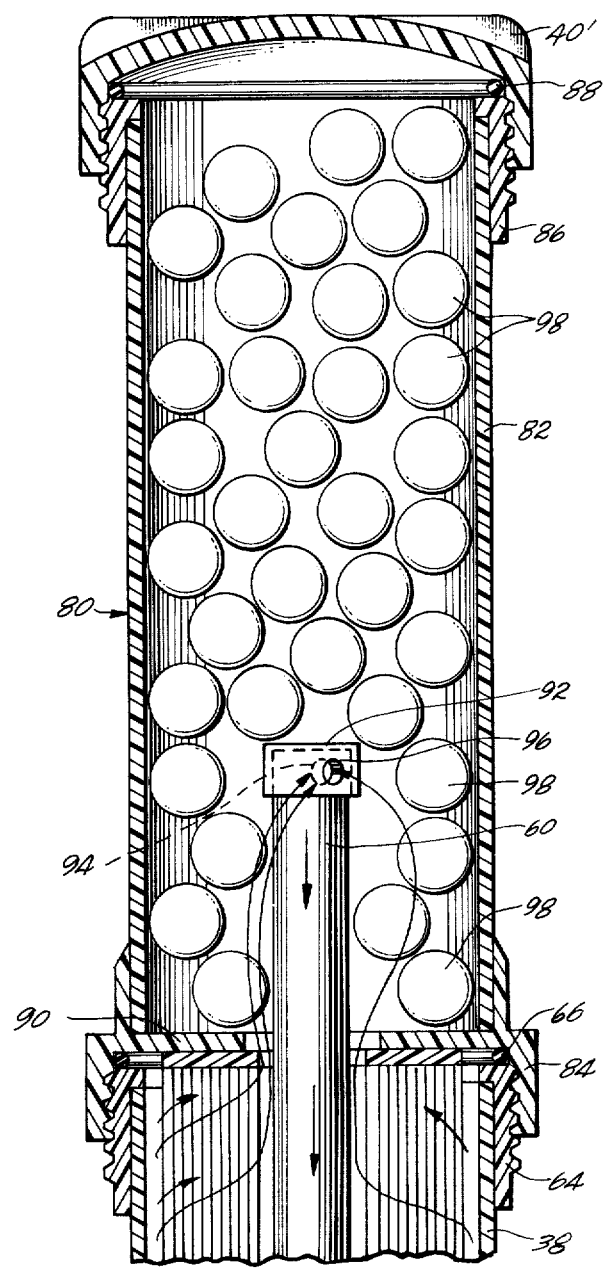
FIG. 3 is a sectional view of the automatic chlorinator unit in combination with the filter module.

Referring to FIG. 3, details of the automatic chlorinator unit are shown. The chlorinator unit, indicated generally at 80, includes a hollow cylindrical pipe section 82 which is preferably made of the same diameter pipe as the stand pipe 38 of the filter module. The lower end of the pipe 82 is attached to an internally threaded molded fitting 84 which threadably engages the collar 64 at the upper end of the stand pipe 38. The fitting 84 replaces the cap 40 at the top of the filter module.

The upper end of the pipe section 82 is attached to a threaded collar 86 to which a cap 40' is secured. An O-ring gasket 88 provides an air-tight seal between the cap and the collar 86. Thus the chlorinator unit 80 provides an airtight extension of the stand pipe 38 of the filter module.

The fitting 84 has an annular portion or flange 90 extending inwardly and forming a shoulder engaging the top of the filter element 70. The vertical tube extends up through the center of the filter unit 70. A longer tube is used with the addition of the automatic chlorinator unit 80, so that the upper end of the tube 60 extends part way up into the interior of the chlorinator unit. A cap 92 is fitted over the top end of the tube 60 to close off the interior of the tube. A hole 94 is formed in the side of the tube 60 beneath the cap which can be placed in varying degrees of registration with a hole 96 in the side of the cap by rotation of the cap 92 on the end of the tube 60. Thus by rotating the cap 92, the volume of water flow through the lower portion of the chlorinator can be adjustably controlled.

With the chlorinator unit in place, the cap 40' can be removed to fill the interior of the unit 80 with conventional chlorine tablets, indicated at 98. When the pump is turned on, assuming sufficient water remaining in the system to prime the pump, water rises in the stand pipes up to the level of the top of the tube 60. The water does not rise much above the top of the tube since it begins to compress the trapped air in the upper portion of the chlorinator unit. However the water rises sufficiently to come in contact with the lowermost chlorine tablets. As the lower tablets become dissolved by the water, the upper tablets move downwardly in the chlorinating unit. When the pump is off, the level of the water drops down below the flange 90 out of contact with the chlorine tablets, thus meeting code requirements that the chlorinator must empty itself when not in use. If full flow through one filter does not provide a sufficient level of chlorination for a particular size pool and for a particular filtering cycle, additional chlorinating units may be added to the other filter modules in the system.

From the above description it will be seen that a novel modular filter system is provided for a swimming pool which can be readily assembled to provide any desired filtering capacity using primarily standard PVC type fittings. This arrangement has considerable advantage over conventional filtering systems, both in ease of installation and overall cost. The filter elements are easily removed for cleaning or replacing and all problems of bleeding of air from the system are eliminated by the interior tube arrangement, which also provides for readily withdrawing the cartridge elements from the filter modules. It will be appreciated that the support 12 need not be in the form of a separate channel member but may be integrally molded as part of the base 36. The automatic chlorinator by being added as an extension to the top of one or more filter modules, provides an integrated chlorinating system which requires no special piping or special controls for filling and emptying the chlorinator when the pump is cycled on and off. Water flow through the chlorinator can be regulated so as to be a small fraction of the total flow of water through the modular filter system. Additional holes may be provided in the tube 60 below the level of the chlorinator unit to reduce the flow through the chlorinator without reducing total flow through the filter.

What is claimed is:

1. A combined pool filter and chlorinating unit using chlorine pellets comprising:
   a fluid-tight housing having an intermediate wall dividing the housing into an upper chamber and a lower chamber, the wall having a central opening therein,
   means admitting pool water into the lower chamber of the housing adjacent the sides thereof,
   a central outlet tube extending vertically upwardly from the bottom of the housing through the opening in the intermediate wall into the upper chamber, the tube having a diameter smaller than the central opening in the intermediate wall,
   a removable annular filter element in the lower chamber extending around the tube in spaced relation to the tube and to the chamber walls,
   means providing a seal between the lower end of the filter element and the outlet tube adjacent the bottom of the lower chamber,
   means providing a seal between the upper end of the filter element and the intermediate wall, whereby pool water admitted to the lower chamber must pass radially inwardly through the filter to reach the outlet tube, the tube having a restricted opening into the tube adjacent the upper end above the intermediate wall for controlling the rate of flow of water through the upper chamber, whereby water passing through the filter rises along the exterior of the tube into the upper chamber to enter the tube, soluble chlorine pellets in the upper chamber supported by the intermediate wall, and air-tight removable means providing access to the upper chamber for loading the pellets in the chamber.

2. The apparatus of claim 1 further including means providing an adjustable size opening at the upper end of the tube to control the rate of flow of pool water through the upper chamber into the tube.

3. Apparatus of claim 1 wherein the housing includes upper and lower sections, the upper section including the upper chamber and intermediate wall, and means removably connecting the upper section to the lower section, whereby the upper section can be detached from the lower section to replace the filter element in the lower chamber.

* * * * *